US011849821B2

(12) United States Patent
Tai

(10) Patent No.: US 11,849,821 B2
(45) Date of Patent: Dec. 26, 2023

(54) VEHICLE-CARRYING LEISURE-PURPOSE PARASOL RACK

(71) Applicant: Yu-Wei Tai, Taoyuan (TW)

(72) Inventor: Yu-Wei Tai, Taoyuan (TW)

( * ) Notice: Subject to any disclaimer, the term of this patent is extended or adjusted under 35 U.S.C. 154(b) by 23 days.

(21) Appl. No.: 17/826,136

(22) Filed: May 26, 2022

(65) Prior Publication Data

US 2023/0380556 A1 Nov. 30, 2023

(51) Int. Cl.
*A45B 11/00* (2006.01)
*B60R 9/00* (2006.01)
*B60R 11/06* (2006.01)
*B60R 11/00* (2006.01)

(52) U.S. Cl.
CPC ............... *A45B 11/00* (2013.01); *B60R 9/00* (2013.01); *B60R 11/06* (2013.01); *B60R 2011/0059* (2013.01)

(58) Field of Classification Search
CPC ............ A45B 11/00; A45B 2023/0031; A45B 2023/0056; A45B 2200/1009; B60R 9/00; B60R 9/06; B60R 9/08; B60R 2011/0059; B60R 2011/0071; B60R 11/06
USPC ....... 248/534, 535, 539, 540, 541, 689, 511, 248/518, 231.21, 316.6, 345
See application file for complete search history.

(56) References Cited

U.S. PATENT DOCUMENTS

| 1,964,119 A * | 6/1934 | Hendry | B66F 5/00 |
| | | | 211/23 |
| 2,545,157 A * | 3/1951 | McCrary | B60C 25/132 |
| | | | 157/17 |
| 3,850,221 A * | 11/1974 | Zrostlik | B60C 25/142 |
| | | | 157/1.33 |
| 4,911,343 A * | 3/1990 | Lords | B60R 11/00 |
| | | | 224/511 |
| 5,213,297 A * | 5/1993 | Laskowski | A47F 7/04 |
| | | | 248/172 |
| 5,558,261 A * | 9/1996 | Hedeen | B60R 9/10 |
| | | | 224/511 |
| 7,533,789 B1 * | 5/2009 | Seely | B60R 9/06 |
| | | | 224/519 |
| 7,703,834 B1 * | 4/2010 | Hardy | B60R 19/023 |
| | | | 296/144 |
| 7,793,699 B2 * | 9/2010 | Vanhouten | B60C 25/025 |
| | | | 157/2 |
| 9,707,809 B2 * | 7/2017 | Hall | B66C 1/44 |

(Continued)

*Primary Examiner* — Terrell L McKinnon
*Assistant Examiner* — Michael McDuffie
(74) *Attorney, Agent, or Firm* — Leong C. Lei

(57) ABSTRACT

A vehicle-carrying leisure-purpose parasol rack includes a screw rod including a hollow tubular grip and a holding seat attached thereto; a connection ring having a thread in mating engagement with the screw rod; a plurality of clamp arms, each of which includes a clamping terminal in a hook form, an extension section, and a mounting terminal, the clamping terminal and the mounting terminal being arranged on two opposite ends of the extension section, the mounting terminals respectively corresponding to retaining notches formed in the connection ring so that the clamp arms are detachably connected to the connection ring; and an assisting member having a fixed terminal and a hollow tubular terminal. The fixed terminal is detachably connected to the extension section of one of the clamp arms, such that the hollow tubular terminal is in alignment with the hollow tubular grip.

6 Claims, 6 Drawing Sheets

(56) References Cited

U.S. PATENT DOCUMENTS

| | | | | |
|---|---|---|---|---|
| 10,384,618 | B2* | 8/2019 | Williams | B60R 9/10 |
| 10,493,924 | B2* | 12/2019 | Samouce | B60R 9/06 |
| 10,625,685 | B1* | 4/2020 | Gruener | B60R 19/38 |
| 11,230,231 | B1* | 1/2022 | Storer, II | B60R 9/06 |
| 2011/0290428 | A1* | 12/2011 | Roussel | B60B 30/06 |
| | | | | 157/1.22 |
| 2012/0031934 | A1* | 2/2012 | Danze | B62D 43/00 |
| | | | | 224/42.12 |
| 2020/0388199 | A1* | 12/2020 | Hammerle | B60R 13/005 |
| 2022/0227310 | A1* | 7/2022 | Kroll | B25H 3/00 |
| 2023/0091144 | A1* | 3/2023 | Heacock | B62D 43/02 |
| | | | | 224/42.26 |

* cited by examiner

VEHICLE-CARRYING LEISURE-PURPOSE PARASOL RACK

TECHNICAL FIELD OF THE INVENTION

The present invention relates generally to a parasol rack for use with a vehicle, and more particularly to a vehicle-carrying leisure-purpose parasol rack that is attachable, through clamping, to a side surface of a vehicle wheel to allow a user to insert and securely hold a parasol and is easy to carry.

DESCRIPTION OF THE PRIOR ART

When traveling with an automobile, people may need to expand a large-sized parasol as a sunshade to shield intense sun light or for blocking rain drops. A wheel clamping device, which is disclosed in Taiwan Utility Model M613008, is available for attaching, through clamping, to a side surface of a wheel of the vehicle to allow a user to insert a parasol therein for supporting. However, the parasol may be blown down by gusts or may be caused to tip and fall by other external forces, even a handle of the parasol has been properly inserted into the known device. There is still room for improvement.

SUMMARY OF THE INVENTION

Thus, the primary objective of the present invention is to provide a vehicle-carrying leisure-purpose parasol rack, which allows a user to easily and securely insert and hold a large-sized parasol. To achieve the above objective, the present invention provides a vehicle-carrying leisure-purpose parasol rack, which comprises a screw rod, which has one end that is provided with a hollow tubular grip perpendicular to the screw rod, an opposite end of the screw rod being detachably connected to a holding seat; a connection ring, which is provided, on an inner side thereof, with a thread mating the screw rod, so that the connection ring is screwable onto the screw rod, the connection ring comprising a plurality of retaining notches formed in and circumferentially arranged on a top surface thereof; a plurality of clamp arms, each of which comprises a clamping terminal in a hook form, an extension section, and a mounting terminal, wherein the clamping terminal and the mounting terminal are arranged on two opposite ends of the extension section, the mounting terminals respectively correspond to the retaining notches so that each of the clamp arms is detachably connected to the connection ring; and an assisting member, which comprises a fixed terminal and a hollow tubular terminal, the fixed terminal being detachably connected to the extension section of one of the clamp arms, such that the hollow tubular terminal is in alignment with the hollow tubular grip.

The user may bring the holding seat into alignment with a central portion of a wheel of a vehicle and rotates the hollow tubular grip to allow the connection ring to move along the screw rod to reach a predetermined location for subsequent connecting engagement with each of the clamp arms. Then, each of the clamp arms is set to have the clamping terminal thereof hooking on and engaging with an inner-side tire wall of the wheel, and afterwards, the mounting terminal is connected to a corresponding one of the retaining notches. The user may further rotate the hollow tubular grip to make the connection ring slightly moving away from the wheel so as to cause each of the clamp arms to tightly grip and clamp on the tire wall of the wheel. The user may then conduct a fine adjustment for setting the hollow tubular grip to be perpendicular to the ground surface. Finally, the assisting member is combined with one of the clamp arms that is perpendicular to the ground surface to set the hollow tubular terminal in alignment with the hollow tubular grip. Then, the user may insert a parasol post of a large-sized parasol into the hollow tubular terminal and the hollow tubular grip. The parasol post cannot be turned even acted upon by an external force, so that stability is improved. The number of each of the clamp arm and each of the retaining notch is three.

In another embodiment, the clamping terminal of each of the clamp arm is rotatably connected to the extension section, and a torsion spring is arranged between each of the clamping terminals and each of the extension sections, so that each of the clamping terminals is made as two separate parts. In a further embodiment, the connection ring of the present invention is formed, in a side surface, with at least one through hole to receive a parasol to insert therein.

DETAILED DESCRIPTION OF THE PREFERRED EMBODIMENT

Figure 1:
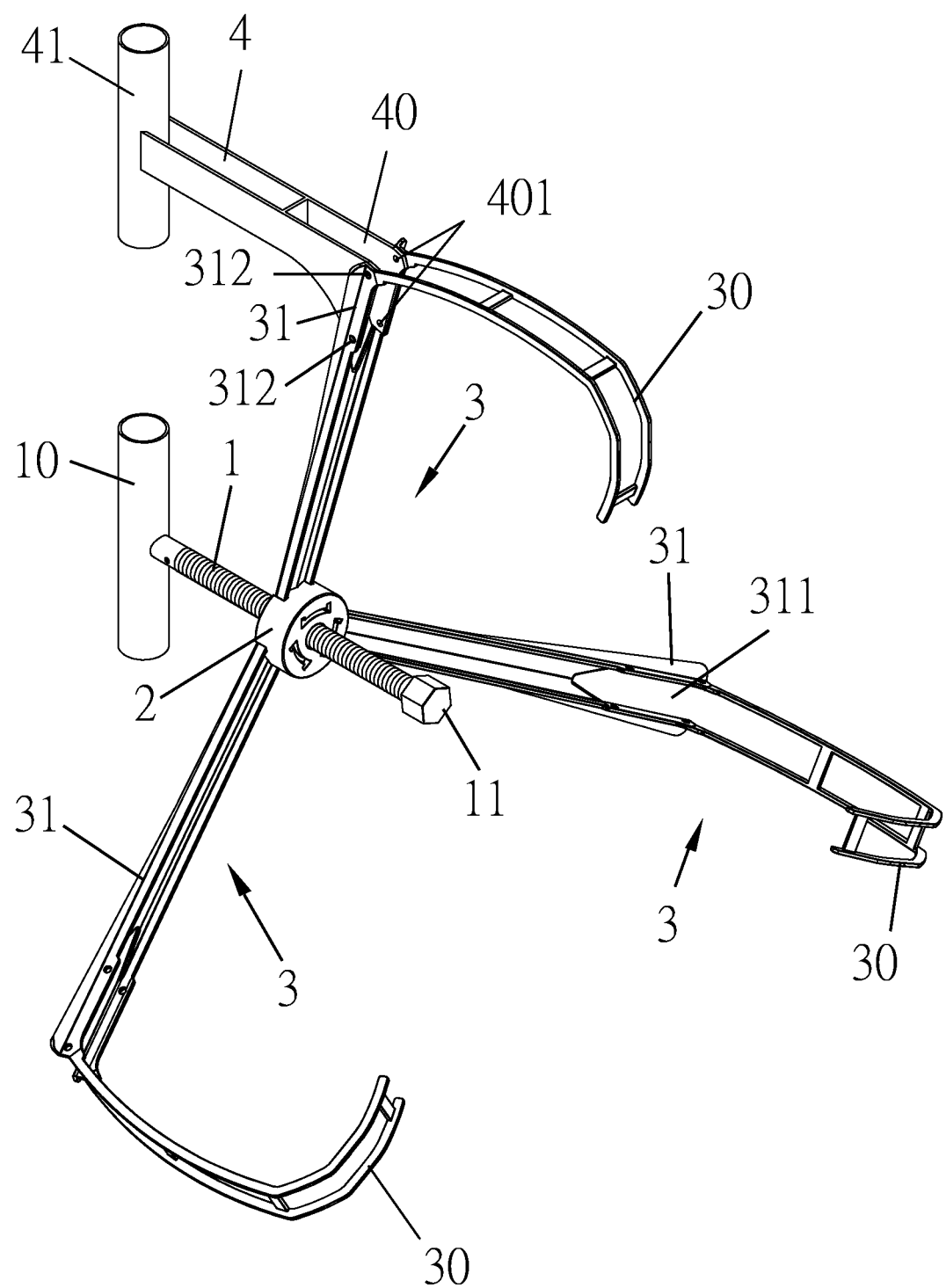
FIG. 1 is a perspective view of an embodiment of the present invention.
Figure 2:
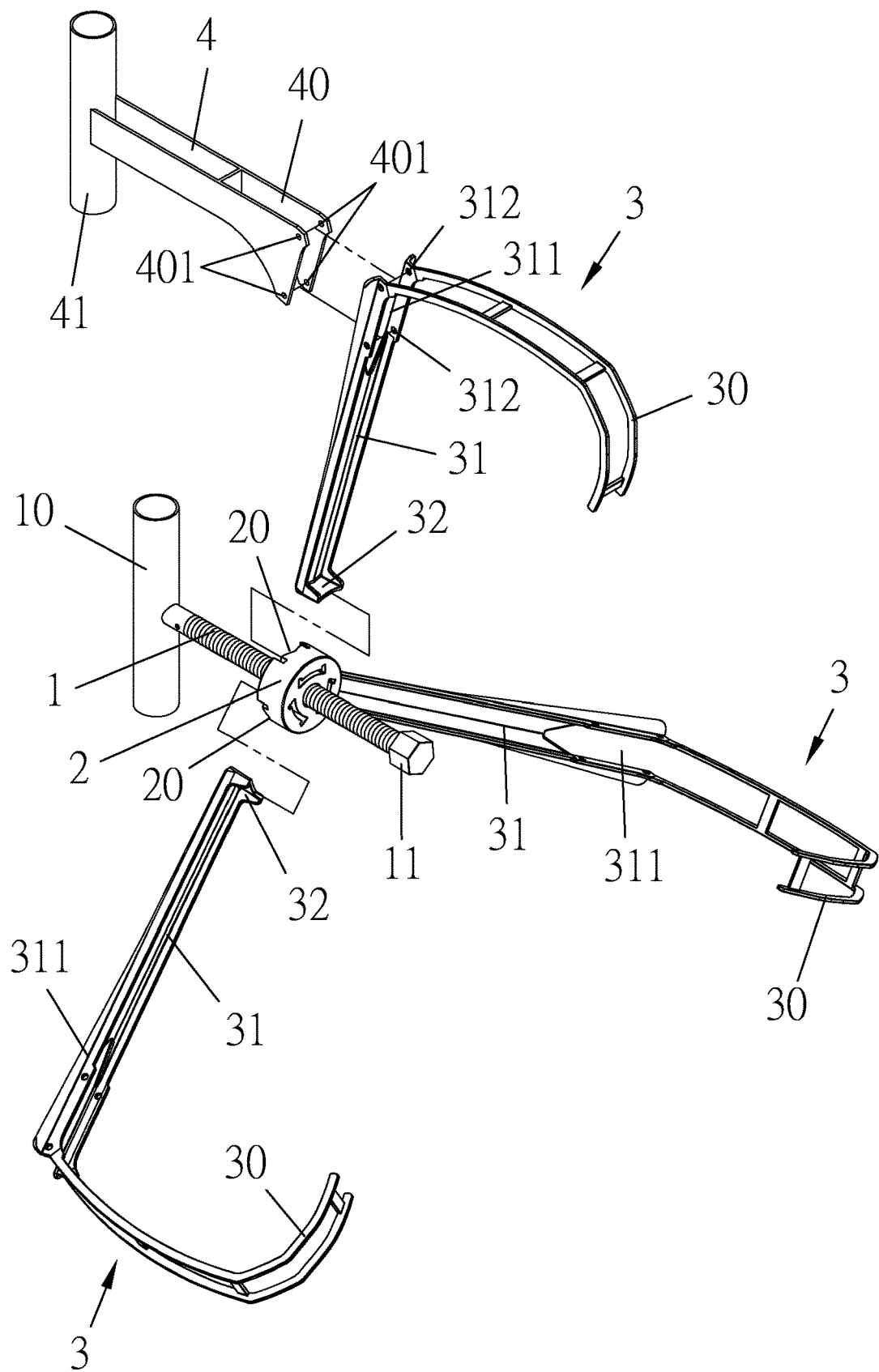
FIG. 2 is an exploded view of FIG. 1.

Referring to FIGS. 1 and 2, which are drawings showing an embodiment of the present invention, the drawings are provided for illustrating a vehicle-carrying leisure-purpose parasol rack according to the embodiment of the present invention, which comprises a screw rod 1 having an end provided with a hollow tubular grip 10 perpendicular to the screw rod 1, an opposite end of the screw rod 1 being detachably connected with a holding seat 11, the holding seat 11 and the screw rod 1 being connected to each other by means of a bearing therebetween, so that rotation of the hollow tubular grip 10 does not cause the holding seat 11 to rotate in unison therewith; a connection ring 2 having an inner side forming a thread corresponding to and mating the screw rod 1, so that the connection ring 2 is screwable onto the screw rod 1, the connection ring 2 having a top surface in which a plurality of retaining notches 20 are formed and arranged circumferentially; a plurality of clamp arms 3, each of which comprises a hook-shaped clamping terminal 30, an extension section 31, and a mounting terminal 32, the clamping terminal 30 and the mounting terminal 32 being respectively arranged at two opposite ends of each of the extension sections 31, the mounting terminals 32 respectively corresponding to the retaining notches 20 to allow each of the clamp arms 3 to be connected, in a detachable manner, to the connection ring 2; and an assisting member 4 comprising a fixed terminal 40 and a hollow tubular terminal 41, the fixed terminal 40 being detachably connected to the extension section 31 of one of the clamp arms 3 to allow the hollow tubular terminal 41 to align with the hollow tubular grip 10. In the instant embodiment, the number of the clamp arms 3 and that of the retaining notches 20 are each three, so that the three clamp arm 3 are angularly spaced from each other by 120 degrees and the three retaining notches 20 are angularly spaced from each other by 120 degrees, but not limited thereto.

As shown in FIG. 2, in the instant embodiment, each of the extension sections 31 is formed with an opening 311 that corresponds to the fixed terminal 40 of the assisting member 4. Each of the clamping terminals 30 is provided with a hook structure extending from each of two sides of the opening 311 and a plurality of connecting portions arranged between the hook structures on the two sides. The two sides of each of the openings 311 are each formed with a plurality of mounting holes 312, and two sides of the fixed terminal 40 are each formed with a plurality of fixing holes 401. The mounting holes 312 are respectively corresponding to the fixing holes 401 to allow a user to apply a plurality of insertion pins (not shown) to respectively penetrate into the mounting holes 312 and the fixing holes 401 that are corresponding to each other, so as to connect the assisting member 4 to the clamp arm 3. The present invention allows the screw rod 1, the holding seat 11, the connection ring 2, each individual one of the clamp arms 3, and the assisting member 4 to separate from each other for easy carrying with a vehicle.

Figure 3:
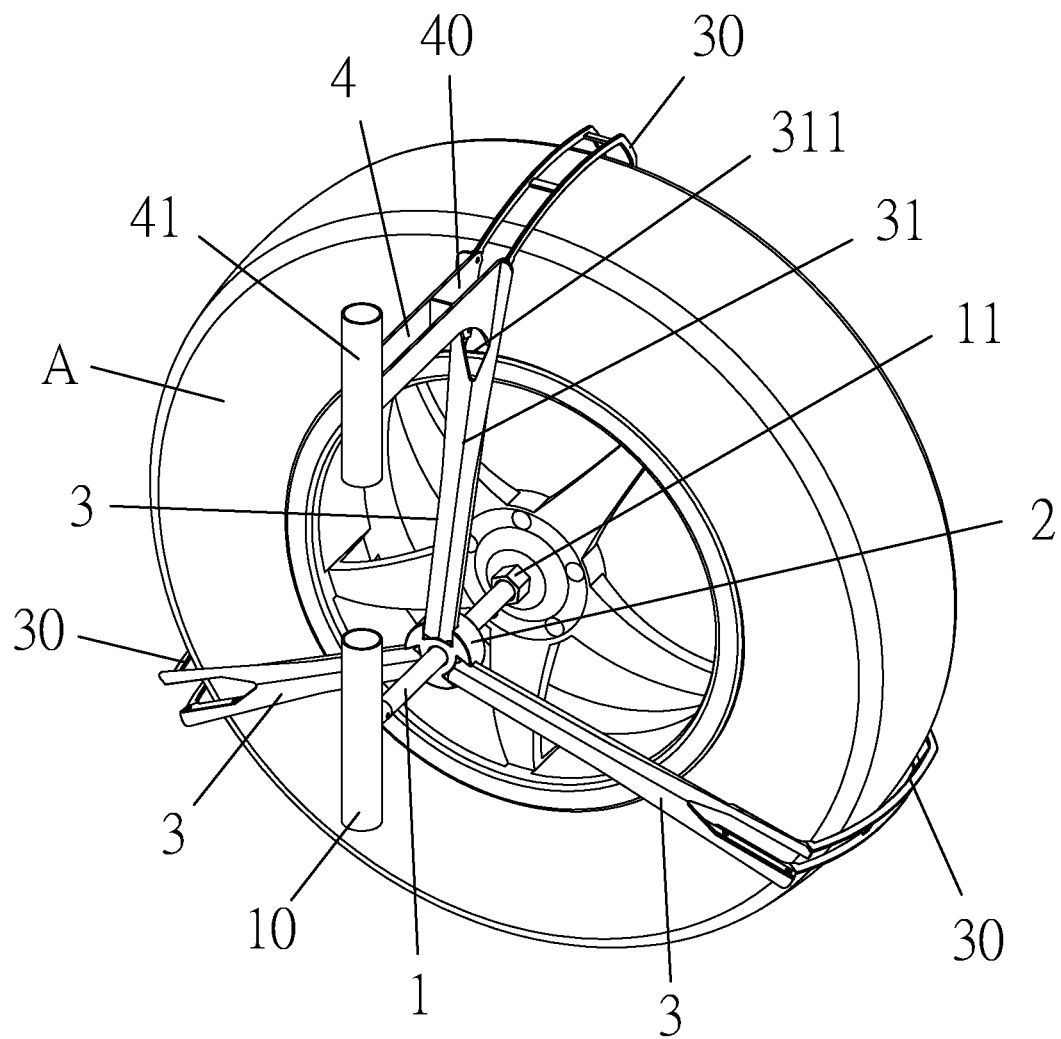
FIG. 3 is a schematic view showing a use of the embodiment of the present invention.
Figure 4:
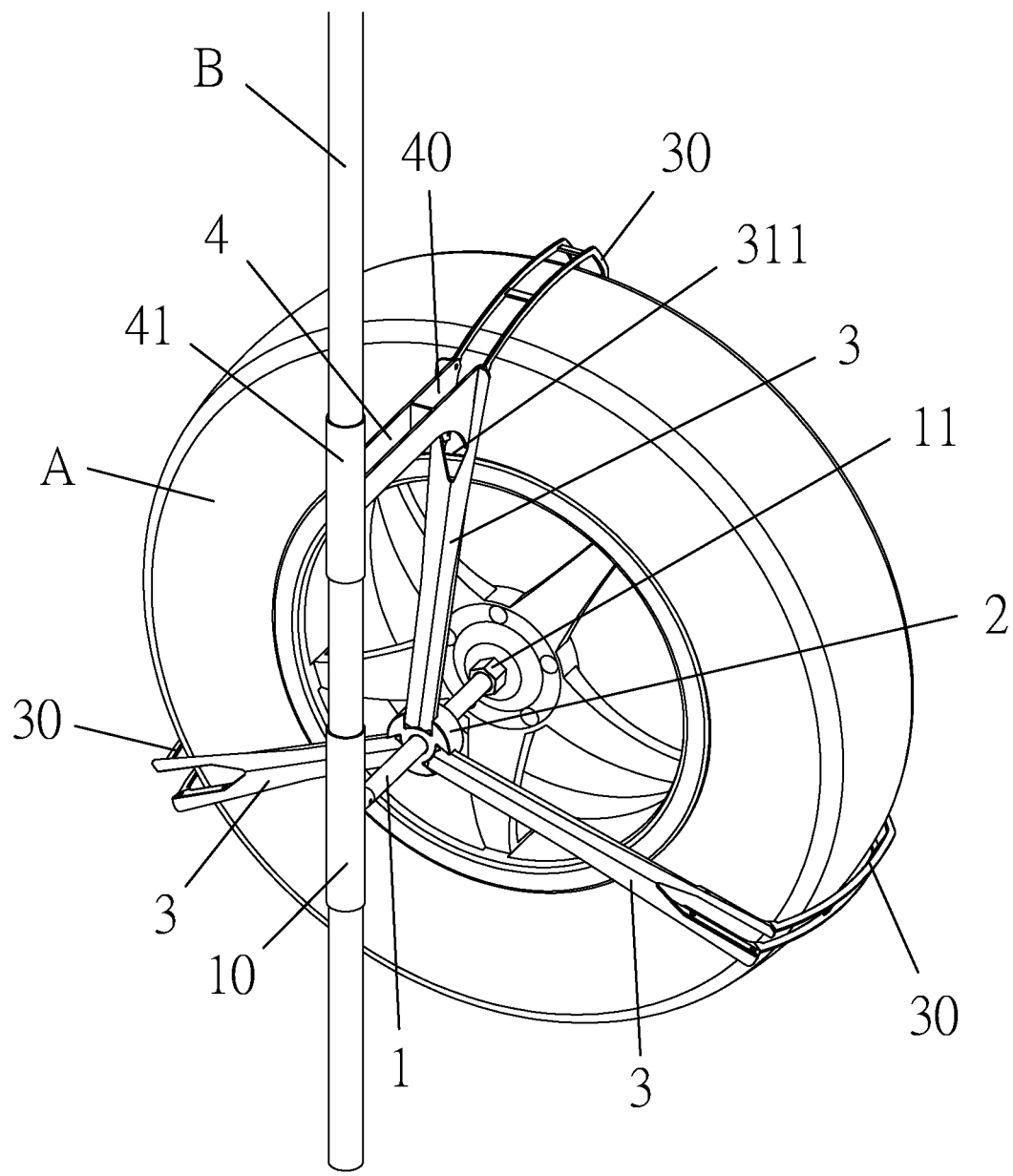
FIG. 4 is another schematic view showing the use of the embodiment of the present invention practically applied to a vehicle-related embodiment.

As shown in FIG. 3, the user may bring the holding seat 11 into alignment with a central portion of a wheel A of a vehicle and rotates the hollow tubular grip 10 to allow the connection ring 2 to move along the screw rod 1 to reach a predetermined location for subsequent connecting engagement with each of the clamp arms 3, and then, each of the clamp arms 3 is set to have the clamping terminal 30 thereof hooking on and engaging with an inner-side tire wall of the wheel A, and afterwards, the mounting terminal 32 is connected to a corresponding one of the retaining notches 20, such that each of the mounting terminals 32 is inserted into and fit in a corresponding one of the retaining notches 20 from a top side of the connection ring 2. The user may further rotate the hollow tubular grip 10 to make the connection ring 2 slightly moving away from the wheel A so as to cause each of the clamp arms 3 to tightly grip and clamp on the tire wall of the wheel A. The user may then conduct a fine adjustment for setting the hollow tubular grip 10 to be perpendicular to the ground surface. Finally, the assisting member 4 is combined with one of the clamp arms 3 that is perpendicular to the ground surface to set the hollow tubular terminal 41 in alignment with the hollow tubular grip 10. Then, the user may insert a parasol post B of a large-sized parasol into the hollow tubular terminal 41 and the hollow tubular grip 10, as shown in FIG. 4. The parasol post B cannot be turned even acted upon by an external force, so that stability is improved, and the user does not need to get concerned about holding and fixing the large-sized parasol by positioning a weight object or tying a rope. The holding seat 11 may be provided, on one side thereof that face and is contactable with a wheel rim, with a soft pad (not shown) to protect the wheel rim of the wheel A from damage.

Figure 5:
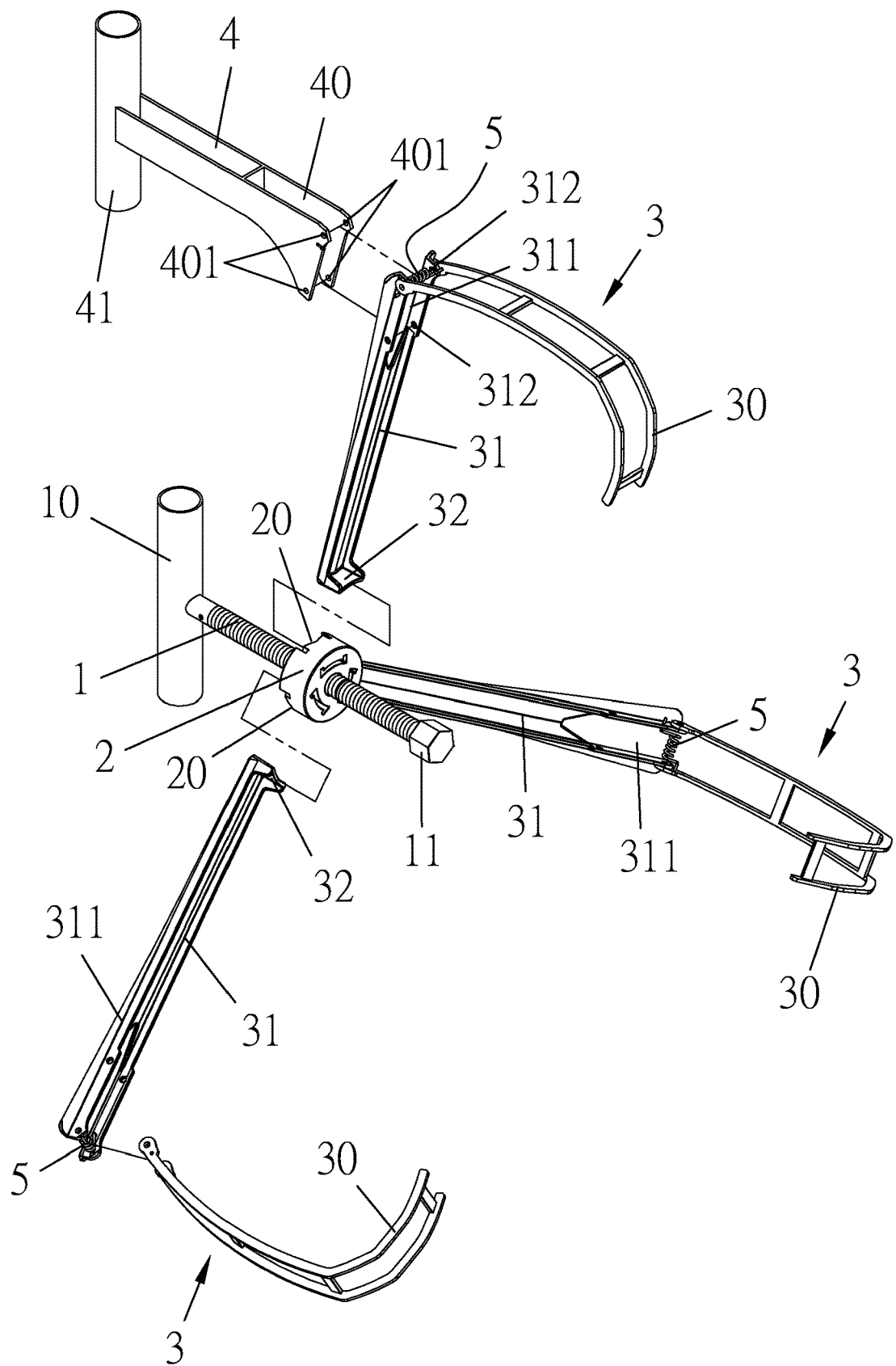
FIG. 5 is a schematic view showing another embodiment of the present invention.
Figure 6:
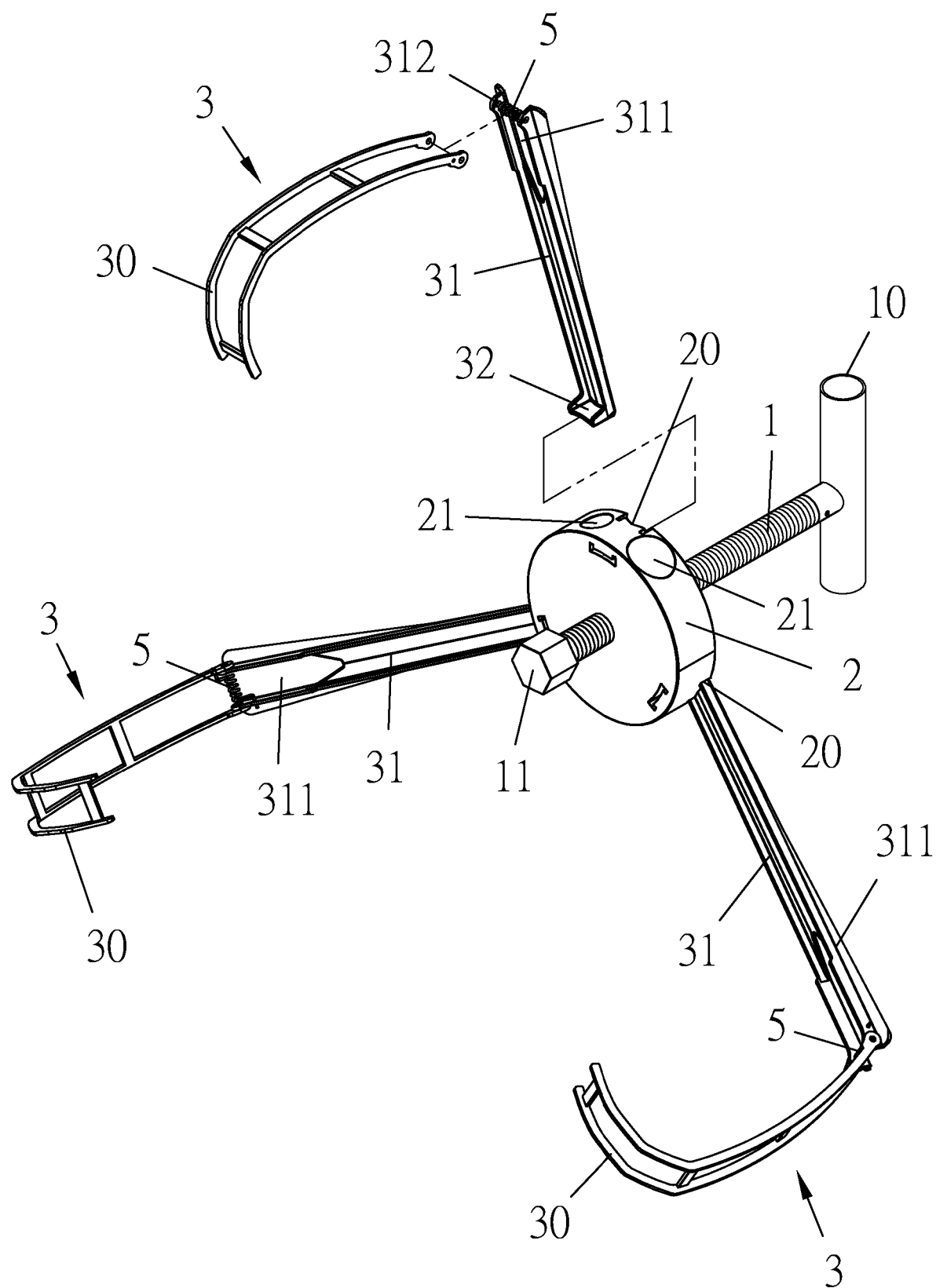
FIG. 6 is a schematic view showing a further embodiment of the present invention.

In another embodiment of the present invention shown in FIG. 5, the clamping terminal 30 of each of the clamp arms 3 is rotatably connected to the extension section 31 and a torsion spring 5 is arranged between each of the clamping terminals 30 and each of the extension sections 31, so that each of the clamp arms 3 is manufactured as two separate parts, rather than a one-piece integrally-formed part. The torsion spring 5 provides a preloading for biasing the clamping terminal 30 toward an inner side of the present invention, so as to allow each of the clamping terminals 30 to easily clamp on the wheel A. In a further embodiment shown in FIG. 6, two through holes 21 of different diameters are formed in a side surface of the connection ring 2 to receive the parasol to insert therein, so that the parasol may not need to penetrate into the hollow tubular grip 10 and the assisting member 4, and as such, the grip can be made in any form.

I claim:

1. A vehicle-carrying leisure-purpose parasol rack, comprising:
    a screw rod, which has one end that is provided with a hollow tubular grip perpendicular to the screw rod, an opposite end of the screw rod being detachably connected to a holding seat;
    a connection ring, which is provided, on an inner side thereof, with a thread mating the screw rod, so that the connection ring is screwable onto the screw rod, the connection ring comprising a plurality of retaining notches formed in and circumferentially arranged on a top surface thereof;
    a plurality of clamp arms, each of which comprises a clamping terminal in a hook form, an extension section, and a mounting terminal, wherein the clamping terminal and the mounting terminal are arranged on two opposite ends of the extension section, the mounting terminals respectively correspond to the retaining notches so that each of the clamp arms is detachably connected to the connection ring; and
    an assisting member, which comprises a fixed terminal and a hollow tubular terminal, the fixed terminal being detachably connected to the extension section of one of the clamp arms, such that the hollow tubular terminal is in alignment with the hollow tubular grip.

2. The vehicle-carrying leisure-purpose parasol rack according to claim 1, wherein the plurality of clamp arms comprise three clamp arms and the plurality of retaining notches comprise three retaining notches.

3. The vehicle-carrying leisure-purpose parasol rack according to claim 1, wherein the clamping terminal of each of the clamp arms is rotatably connected to the extension section, and a torsion spring is arranged between the clamping terminal and the extension section.

4. A vehicle-carrying leisure-purpose parasol rack, comprising:
    a screw rod, which has one end that is provided with a grip, an opposite end of the screw rod being detachably connected to a holding seat;
    a connection ring, which is provided, on an inner side thereof, with a thread mating the screw rod, so that the connection ring is screwable onto the screw rod, the connection ring comprising a plurality of retaining notches formed in and circumferentially arranged on a top surface thereof, the connection ring having a side surface that is formed with at least one through hole; and
    a plurality of clamp arms, each of which comprises a clamping terminal in a hook form, an extension section, and a mounting terminal, wherein the clamping terminal and the mounting terminal are arranged on two opposite ends of the extension section, the mounting terminals respectively corresponds to the retaining notches so that each of the clamp arms is detachably connected to the connection ring.

5. The vehicle-carrying leisure-purpose parasol rack according to claim 4, wherein the plurality of clamp arms comprise three clamp arms and the plurality of retaining notches comprise three retaining notches.

6. The vehicle-carrying leisure-purpose parasol rack according to claim 4, wherein the clamping terminal of each of the clamp arms is rotatably connected to the extension section, and a torsion spring is arranged between the clamping terminal and the extension section.

\* \* \* \* \*